US012515880B2

(12) United States Patent
Hatteland et al.

(10) Patent No.: US 12,515,880 B2
(45) Date of Patent: Jan. 6, 2026

(54) SYSTEM FOR PROVIDING SECURE STORING AND RETRIEVING OF PERSONAL STORAGE CONTAINERS VIA AN INTERACTION AREA

(71) Applicant: Autostore Technology AS, Nedre Vats (NO)

(72) Inventors: Magne Hatteland, Stavanger (NO); Ivar Fjeldheim, Haugesund (NO); Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 595 days.

(21) Appl. No.: 17/599,952

(22) PCT Filed: Mar. 16, 2020

(86) PCT No.: PCT/EP2020/057125
§ 371 (c)(1),
(2) Date: Sep. 29, 2021

(87) PCT Pub. No.: WO2020/200739
PCT Pub. Date: Oct. 8, 2020

(65) Prior Publication Data
US 2022/0194705 A1 Jun. 23, 2022

(30) Foreign Application Priority Data
Mar. 29, 2019 (NO) .................................. 20190432

(51) Int. Cl.
*B65G 1/137* (2006.01)
*B65G 1/04* (2006.01)

(52) U.S. Cl.
CPC ............ *B65G 1/137* (2013.01); *B65G 1/0464* (2013.01); *B65G 1/0485* (2013.01); *B65G 2201/0235* (2013.01); *B65G 2203/046* (2013.01)

(58) Field of Classification Search
CPC ....... G07F 9/001; B65G 1/137; B65G 1/0464; B65G 1/06; B65G 1/0485; B65G 2201/0235; B65G 2203/046; B65G 1/04
See application file for complete search history.

(56) References Cited

U.S. PATENT DOCUMENTS 8,509,944 B1 * 8/2013 Kranyec ................. G07F 17/12
700/214
8,651,790 B2 2/2014 Benedict et al.
(Continued)

FOREIGN PATENT DOCUMENTS

CN 105051763 A 11/2015
CN 109422061 A 3/2019
(Continued)

OTHER PUBLICATIONS

Office Action issued in counterpart Norwegian Patent Application No. 20190432 mailed on Feb. 6, 2024 (3 pages).
(Continued)

*Primary Examiner* — Timothy R Waggoner
(74) *Attorney, Agent, or Firm* — Baker Botts L.L.P.

(57) ABSTRACT

A system for providing secure storage and retrieval of storage containers linked to different users includes an automated storage and retrieval system, a main control system, and a user interface. The automated storage and retrieval system has a framework structure defining a storage grid for storing storage containers arranged in stacks in storage columns and at least one container handling vehicle (Continued)

configured to raise storage containers from and lower storage containers into the storage columns and to transport storage containers to a container transport assembly connecting the automated storage and retrieval system to a plurality of interaction areas for accessing and transferring storage containers to and from the automated storage and retrieval system. The main control system is signal connected to an interaction area controller for keeping track of storage containers and their location in the automated storage and retrieval system and controls transfer of storage containers between the automated storage and retrieval system and the interaction areas. The container transport assembly and the interaction areas both include a transferring mechanism for moving a storage container to and from the container transport assembly and the interaction areas. The transferring mechanism of the container transport assembly includes a storage container support with a support transfer element. Each interaction area includes at least one access station for giving access to and enabling transferring of storage containers or items to and from the interaction area. The user interface has an identification mechanism for identifying a user and for controlling user access to the access station and for interacting with the automatic storage and retrieval system.

10 Claims, 12 Drawing Sheets

(56) References Cited

U.S. PATENT DOCUMENTS

| | | | | |
|---|---|---|---|---|
| 10,913,602 | B2* | 2/2021 | Lindbo | B65G 57/03 |
| 2007/0065259 | A1 | 3/2007 | Talley | |
| 2017/0355524 | A1* | 12/2017 | Hognaland | B66F 9/063 |
| 2018/0134492 | A1* | 5/2018 | Lert, Jr. | G06Q 30/0617 |
| 2019/0300286 | A1* | 10/2019 | Hognaland | B65G 1/1378 |
| 2020/0226543 | A1* | 7/2020 | Sharinn | G06K 7/1439 |

FOREIGN PATENT DOCUMENTS

| | | |
|---|---|---|
| DE | 102012022454 A1 | 5/2014 |
| GB | 2541764 A | 3/2017 |
| GB | 2558798 A | 7/2018 |
| JP | S62-031603 A | 2/1987 |
| JP | 2001253511 A | 9/2001 |
| JP | 2004100233 A | 4/2004 |
| JP | 2018-025896 A | 2/2018 |
| NO | 317366 B1 | 10/2004 |
| TW | 201813900 A | 4/2018 |
| WO | 2014075937 A1 | 5/2014 |
| WO | 2014090684 A1 | 6/2014 |
| WO | 2014195901 A1 | 12/2014 |
| WO | 2015193278 A1 | 12/2015 |
| WO | 2017211596 A1 | 12/2017 |
| WO | 2017211640 A1 | 12/2017 |
| WO | 2018162757 A1 | 9/2018 |

OTHER PUBLICATIONS

Office Action issued in Chinese Application No. 202080039702.4; Dated Dec. 15, 2022 (5 pages).
Search Report issued in Norwegian Application No. 20190432; Dated Oct. 29, 2019 (2 pages).
International Search Report issued in International Application No. PCT/EP2020/057125, mailed Jun. 23, 2020 (6 pages).
Written Opinion issued in International Application No. PCT/EP2020/057125; Dated Jun. 23, 2020 (6 pages).
International Preliminary Report on Patentability issued in International Application No. PCT/EP2020/057125; mailed Mar. 22, 2021 (11 pages).
Office Action issued in counterpart Japanese Patent Application No. 2021-557748 mailed on Nov. 24, 2023 (12 pages).
Toshiaki Itazawa, Notice of Final Rejection issued in Japanese Patent Application No. 2021-557748, mailed Jul. 10, 2024, 6 pages (including translation), Japan Patent Office, Toyko, Japan.
Marko Peltonen, Office Action in Norwegian Patent Application No. 20190432 dated Jan. 14, 2025, Norwegian Industrial Property Office, Oslo, Norway, 2 pages.
Anonymous, Request for the Submission of an Opinion in Korean Patent Application No. 10-2021-7035183, dated Mar. 18, 2025, Korean Intellectual Property Office, Daejeon, Republic of Korea, 19 pages (inclusive of translation).

* cited by examiner

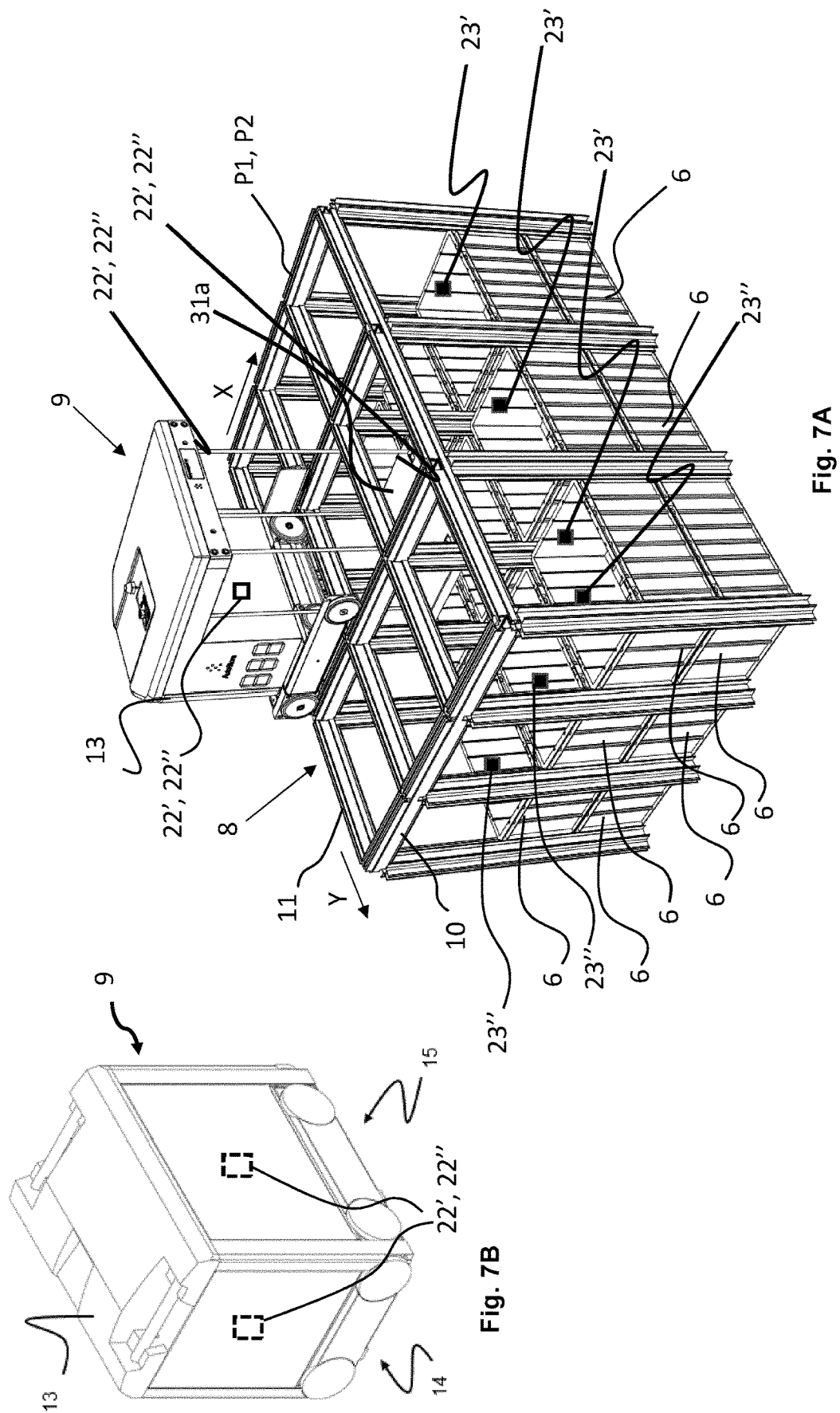

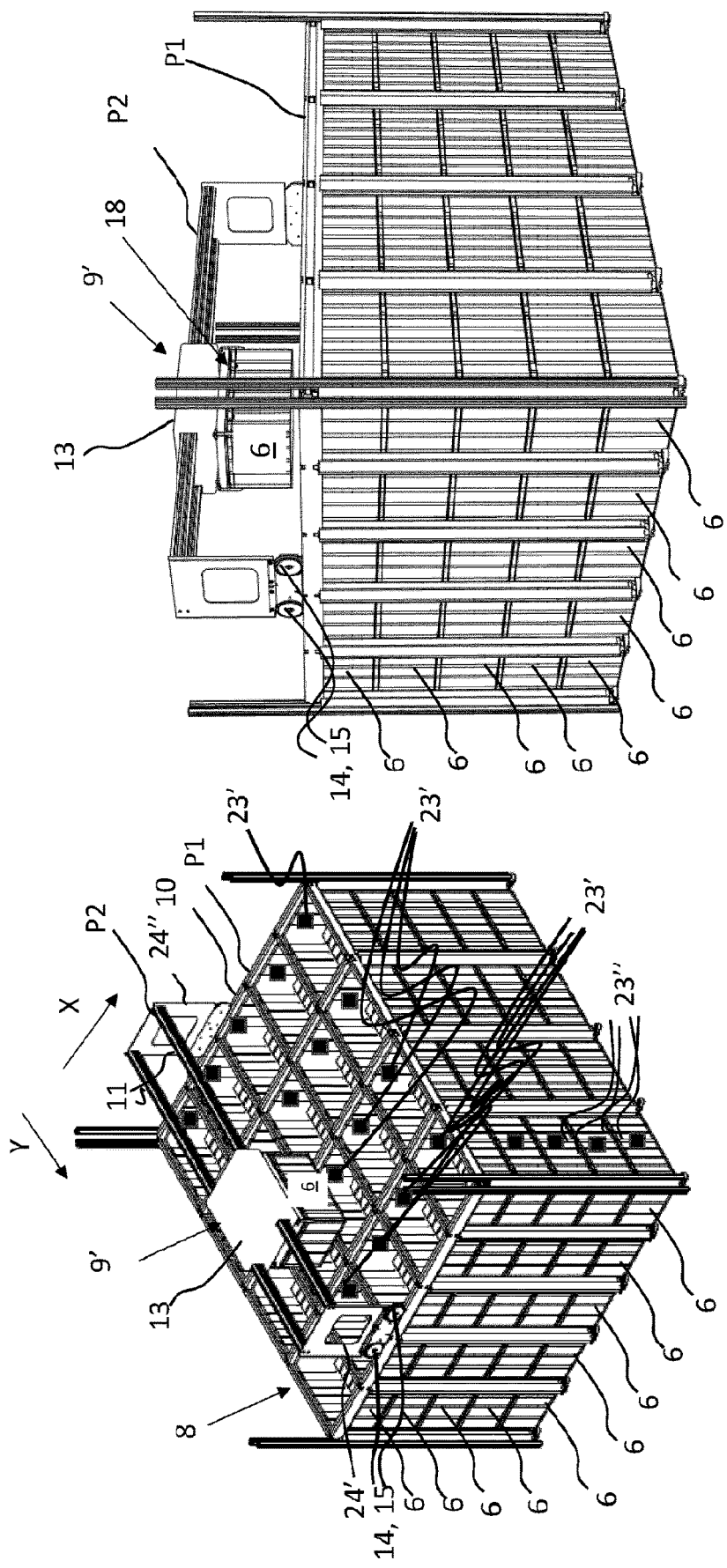

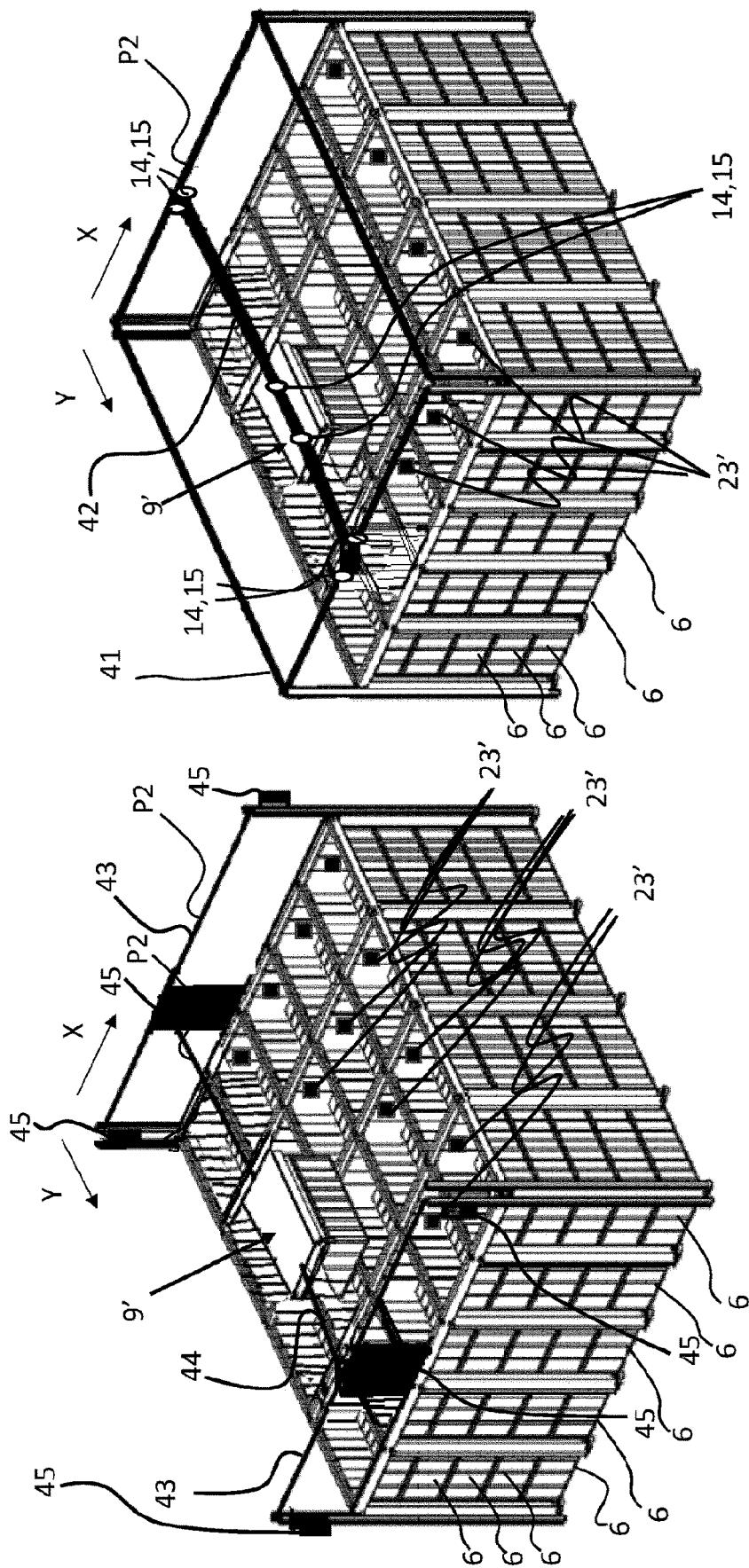

SYSTEM FOR PROVIDING SECURE STORING AND RETRIEVING OF PERSONAL STORAGE CONTAINERS VIA AN INTERACTION AREA

The present invention relates to a system for transferring storage containers between an automated storage and retrieval system and a plurality of interaction areas placed at different locations such as within an apartment building, a terraced house or similar. More specifically, the invention relates to a system providing secure storage and retrieval of storage containers linked to persons, where a storage container is transferred between an automated storage and retrieval system and a plurality of interaction areas connected to the system.

BACKGROUND AND PRIOR ART

FIG. 1 discloses a framework structure 1 of a typical prior art automated storage and retrieval system and FIGS. 2A-2C disclose different prior art container handling vehicles 9 of such a system.

The framework structure 1 comprises a plurality of upright members 2 and a plurality of horizontal members 3, which are supported by the upright members 2. The members 2, 3 may typically be made of metal, e.g. extruded aluminium profiles.

The framework structure 1 defines a storage grid 4 comprising grid columns 5' arranged in rows, in which the grid columns 5' form storage columns 5 for storing storage containers 6, also known as bins, are stacked one on top of another to form stacks 7. Each storage container 6 may typically hold a plurality of product items (not shown). The product items within a storage container 6 may be identical or may be of different product types depending on the application. The framework structure 1 guards against horizontal movement of the stacks 7 of storage containers 6, and guides vertical movement of the containers 6, but does normally not otherwise support the storage containers 6 when stacked.

A rail system 8 is arranged in a grid pattern across the top of the storage columns 5, on which rail system 8 a plurality of container handling vehicles 9 are operated to raise storage containers 6 from and lower storage containers 6 into the storage columns 5, and also to transport the storage containers 6 above the storage columns 5. The rail system 8 comprises a first set of parallel rails 10 arranged to guide movement of the container handling vehicles 9 in a first direction X across the top of the frame structure 1, and a second set of parallel rails 11 arranged perpendicular to the first set of rails 10 to guide movement of the container handling vehicles 9 in a second direction Y, which is perpendicular to the first direction X. In this way, the rail system 8 defines grid columns 5' above which the container handling vehicles 9 can move laterally above the grid columns 5', i.e. in a plane which is parallel to the horizontal X-Y plane.

Each container handling vehicle 9 comprises a vehicle body 13 and first and second sets of wheels 14, 15 which enable the lateral movement of the container handling vehicle 9, i.e. the movement in the X and Y directions. In FIGS. 2A and 2B only two wheels in one of the set of wheels 14 are visible head on (two wheels in the other set of wheels are visible side on), while in FIG. 2C two wheels in each of the sets 14, 15 are easily seen. The first set of wheels 14 is arranged to engage with and run on the first set 10 of rails, and the second set of wheels 15 is arranged to engage with and run on the second set 11 of rails. Each set of wheels 14, 15 can be lifted and lowered, so that the first set of wheels 14 and/or the second set of wheels 15 can be engaged with the respective set of rails 10, 11 at any one time.

Each container handling vehicle 9 also comprises a lifting device 16 (see FIGS. 2A, 2B and 2D) for vertical transportation of storage containers 6, e.g. raising a storage container 6 from and lowering a storage container 6 into a storage column 5. The lifting device 16 may be arranged outside the body 13 (as disclosed in FIGS. 2A and 2B) or inside the body 13 (as disclosed in FIG. 2C).

The lifting device 16 may, as shown in FIG. 2D, comprise a lifting frame 18 which is adapted to engage a storage container 6, which lifting frame 18 can be lowered from the vehicle body 13 so that the position of the lifting frame 18 with respect to the vehicle body 13 can be adjusted in a third direction Z, which is orthogonal the first direction X and the second direction Y. The lifting frame 18 of the lifting device 16 may comprise a plurality of gripping devices 26 for gripping/engaging with the storage container 6 and a plurality of guiding pins 17 for aligning the lifting device 16 with the storage container 6. The storage container in FIG. 2D comprises a single compartment 27, however storage containers comprising multiple compartments are also known.

In FIG. 1, Z=1 identifies the uppermost layer of the grid 4, i.e. the layer immediately below the rail system 8, Z=2 the second layer below the rail system 8, Z=3 the third layer etc. In the embodiment disclosed in FIG. 1, Z=8 identifies the lowermost, bottom layer of the grid 4. Consequently, as an example and using the Cartesian coordinate system X, Y, Z indicated in FIG. 1, the storage container identified as 7' in FIG. 1 can be said to occupy grid location or cell X=10, Y=2, Z=3. The container handling vehicles 9 can be said to travel in layer Z=0 and each grid column 5' can be identified by its X and Y coordinates.

Each container handling vehicle 9 comprises a storage compartment or space for receiving and stowing a storage container 6 when transporting the storage container 6 across the grid 4. The storage compartment or space can be arranged to one side of the body as disclosed in FIGS. 2A and 2B, i.e. the container handling vehicles may have a cantilever construction, as is described in NO317366, the contents of which are also incorporated herein by reference. Alternatively, the storage compartment or space may comprise a cavity arranged centrally within the vehicle body 13 (FIG. 2C), e.g. as is described in WO2014/090684A1, the contents of which are incorporated herein by reference.

The container handling vehicles 9 may have a footprint 25 (see FIG. 4), i.e. an extent in the X and Y directions, which is generally equal to the lateral or horizontal extent of a grid column 5', i.e. the extent of a grid column 5' in the X and Y directions, e.g. as is described in WO2015/193278A1, the contents of which are incorporated herein by reference. Alternatively, the container handling vehicles 9 may have a footprint which is larger than the lateral extent of a grid column 5', e.g. as is disclosed in WO2014/090684A1.

The rail system 8 may be a single track rail system, as is shown in FIG. 3. Alternatively, the rail system 8 may be a double track rail system, as is shown in FIG. 4, thus allowing a container handling vehicle 9 having a footprint 25 generally corresponding to the lateral extent of a grid column 5' to travel along a row of grid columns 5' even if another container handling vehicle 9 is positioned above a grid column 5' neighbouring that row.

In a storage grid, most of the grid columns 5' are storage columns, i.e. grid columns 5' where storage containers 6 are stored in stacks. However, a grid normally has at least one grid column 5' which is used not for storing storage containers 6, but which comprises a location where the container handling vehicles 9 can drop off and/or pick up storage containers 6 so that they can be transported to an access station where the storage containers 6 can be accessed from outside of the storage grid 4 or transferred out of or into the storage grid 4. Within the art, such a location is normally referred to as a "port" and the grid column 5' in which the port is located may be referred to as a port column.

The storage grid 4 in FIG. 1 comprises two port columns 19 and 20. The first port column 19 may for example be a dedicated drop-off port column where the container handling vehicles 9 can drop off storage containers 6 to be transported to an access or a transfer station (not shown), and the second port 20 column may be a dedicated pick-up port column where the container handling vehicles 9 can pick up storage containers 6 that have been transported to the storage grid 4 from an access or a transfer station.

The access station may typically be a picking or a stocking station where product items are removed from or positioned into the storage containers 6. In a picking or a stocking station, the storage containers are normally never removed from the automated storage and retrieval system but are returned into the storage grid 4 once accessed.

A port can also be used for transferring storage containers 6 out of or into the storage grid 4, e.g. for transferring storage containers 6 to another storage facility (e.g. to another grid or to another automated storage and retrieval system), to a transport vehicle (e.g. a train or a lorry), or to a production facility.

When a storage container 6 stored in the storage grid 4 disclosed in FIG. 1 is to be accessed, one of the container handling vehicles 9 is instructed to retrieve the target storage container 6 from its position in the storage grid 4 and transport it to the drop-off port 19. This operation involves moving the container handling vehicle 9 to a grid location above the storage column 5' in which the target storage container 6 is positioned, retrieving the storage container 6 from the storage column 5' using the container handling vehicle's lifting device (not shown in FIG. 1), and transporting the storage container 6 to the drop-off port 19. If the target storage container 6 is located deep within a stack 7, i.e. with one or a plurality of other storage containers 6 positioned above the target storage container 6, the operation also involves temporarily moving the above-positioned storage containers 6 prior to lifting the target storage container 6 from the storage column 5'. This step, which is sometimes referred to as "digging" within the art, may be performed with the same container handling vehicle 9 that is subsequently used for transporting the target storage container 6 to the drop-off port 19, or with one or a plurality of other cooperating container handling vehicles 9. Alternatively, or in addition, the automated storage and retrieval system may have container handling vehicles 9 specifically dedicated to the task of temporarily removing storage containers 6 from a storage column. Once the target storage container 6 has been removed from the storage column 5', the temporarily removed storage containers 6 can be repositioned into the original storage column. However, the removed storage containers 6 may alternatively be relocated to other storage columns 5'.

When a storage container 6 is to be stored in the storage grid 4, one of the container handling vehicles 9 is instructed to pick up the storage container from the pick-up port 20 and transport it to a grid location above the target storage column 5' where it is to be stored, after any temporarily stored storage container 6 positioned at or above the target position within the storage column stack has been removed. The container handling vehicle 9 will then position the storage container 6 at the desired position. The removed storage containers 6 may then be lowered back into the storage column 5' or relocated to other storage columns 5'.

For monitoring and controlling the automated storage and retrieval system, e.g. monitoring and controlling the location of respective storage containers within the storage grid 4 and the movement of the container handling vehicles 9 so that a desired storage container 6 can be delivered to the desired location at the desired time, the automated storage and retrieval system comprises a control system, which typically is computerised and comprises a database for keeping track of the storage containers and their locations within the storage grid 4.

When the automated storage and retrieval system described above is connected to a plurality of interaction areas placed at different locations such as e.g. within an apartment building, a terraced house, or other buildings that are shared by multiple people, for example, nursing homes, student accommodation, army barracks or similar, there is a need for an easy secure way of moving storage containers between the storage and retrieval system and a specific interaction area.

The present invention relates to a system for providing centralized storage of storage containers linked to users and interaction areas.

An object of the invention is to provide secure transfer of storage containers linked to users, where the storage containers are transferred between the automated storage and retrieval system and a plurality of interaction areas connected to the system. That is, only storage containers that are registered in the system by a specific user and at a specific interaction area will be available for that user at the registered interaction area or at an interaction area where the user is identified and authorised for accessing the storage container.

Another objective of the invention to provide a system which can easily move storage containers between an automated storage and retrieval system and a plurality of interaction areas.

Another objective is to provide a system having a low possibility of break down and requiring as little maintenance as possible.

SUMMARY OF THE INVENTION

The invention is set forth in the independent claims and the dependent claims describe alternatives of the invention.

The invention concerns a system for providing secure storing and retrieving of storage containers linked to users.

The system comprises an automated storage and retrieval system, having a framework structure defining a storage grid for storing storage containers arranged in stacks in storage columns. It further comprises at least one container handling vehicle configured to raise storage containers from and lower storage containers into the storage columns and to transport the storage containers above the storage columns.

The system further comprises a plurality of interaction areas for transferring storage containers to and from the automated storage and retrieval system and a container transport assembly connecting the automated storage and retrieval system to the interaction area(s) and which is adapted for transferring storage containers between the automated storage and retrieval system and the interaction areas.

The system further comprises a control system for keeping track of storage containers and their location in the automated storage and retrieval system and for controlling transfer of storage containers between the automated storage and retrieval system and the interaction area(s).

The container transport assembly and the interaction area(s) comprise cooperating transferring means for moving a storage container to and from the container transport assembly and the interaction area. The transferring means of the container transport assembly comprises a storage container support with a support transfer element.

In one embodiment the cooperating means is a transfer element, e.g. conveyor belt installed on the container transport assembly or a base at the interaction area for moving a storage container from the container transport assembly to a base at the interaction area.

Each interaction area comprises at least one access station for transferring storage containers to and from the automated storage and retrieval system, a user interface for interacting with the automatic storage and retrieval system and identification means for controlling user access to the access station.

The user interface at the interaction area may be any kind of interface enabling a user access to the storage and retrieval system, e.g. a fixed installation at the interaction area or a mobile device such as a smart phone or a tablet. The access station may for example be a gap, a door, a lid, a drawer or the like that are accessible for a user upon successful identification. The identification means may be implemented in a mobile device such as a tablet or mobile phone communicating with the control system of the automated storage and retrieval system. It may also be implemented in a fixed installation with a user interface for accessing the system.

The identification means can also be used for registering items to be stored in storage containers, e.g. by registering visual features represented by visual data. The visual data can be provided by a camera capturing images of items placed in a specific storage container. The camera can be installed at the interaction area and have a field of view such that items placed in a storage container are captured. In another embodiment, the camera may be integrated in a portable device running the computer program, e.g. smart phone or tablet. A picture of the content of a storage container can then be captured with a camera already integrated in the portable device. Registered items are linked to a storage container and catalogued in an inventory database.

According to one embodiment of the invention, the system comprises two or more interaction areas arranged at different vertical floors in a house. In one embodiment of the invention, the interaction areas are arranged at different vertical floors than a floor where the automated storage and retrieval system is installed.

The automated storage and retrieval system may be installed in a basement, an attic, or in between the interaction areas in a house. The container transport assembly will be adapted to the floor plan and type of house where it is installed. It may accordingly comprise a vertical or inclined storage container lift or an horizontal conveyor.

If used in a single house, the system typically has one user which has access to one or more interaction areas. The house may have multiple interaction areas, e.g. one interaction area on each floor or two or more interaction areas arranged on each floor, where the user can decide on which floor he or she wants the storage container to be delivered.

If the system according to the invention is employed in an apartment building or other house with multiple users, the users have access to own dedicated containers via one or more interaction area(s) in each apartment. The system is provided with an identification system both for verifying that the user requesting a specific storage container shall have access to this and that the user has access to the dedicated interaction area.

The identification system may further include any means for performing identification of storage containers such as a Radio Frequency Identification (RFID) reader arranged in connection with each of the interaction areas or, alternatively or in addition, a reader may be arranged in connection with the container handling vehicle, for example on the lifting device of the vehicle or inside the vehicle body. This may improve security if multiple users are using the same storage and retrieval system but where each user only has access to their own storage containers.

In one aspect, the RFID reader can read an RFID labelled storage container, however other readers and labels are possible for identifying a storage container. As an alternative to RFID, other electromagnetic field systems (NFC), optical systems (barcode, QR code, camera reading written or engraved labels) may be used to improve security in relation to identification of storage containers.

As an additional security check, if a user has placed an order for a specific storage container at a specific interaction area, the storage container may be scanned at the interaction area and the system will decide whether the access station at the interaction area shall have access to the specific storage container or not.

The system according to the invention can also be employed by retrofitting it in for instance apartment buildings where prior, now shut down, rubbish/refuse chute(s) can be retrofitted with a container transport assembly and an operator access station for retrieving item(s) from or placing item(s) into the storage container. If a retrofit is done, e.g. a rubbish/refuse chute which used to be a common rubbish/refuse chute for more than one apartment, an additional ID-control may be provided at the operator interface, e.g. passcode, RFID of storage container, finger print recognition, eye recognition, voice recognition etc. In addition, a camera may be provided at the interaction area for photographing the content of a storage container before the storage container is placed in the automated storage and retrieval system. Images may be stored in an inventory database comprised in the operable control system. The user operable control system may comprise means for providing an overview of the content of storage containers in the automated storage and retrieval system such that the operator easily can identify a specific storage container e.g. by using an image displaying device signal connected to the user operable control system.

When a storage container has been retrieved from the automated storage and retrieval system to the interaction area, a sound or other form of alarm such as light may be activated to notify or alert a user that the storage container has arrived at the interaction area and can be accessed at the access station.

The access station may comprise a picking and/or supply station in the form of e.g. a drawer device comprising a space for accommodating a storage container. The storage container comprises one or more compartments for storing one or more product item(s) to be picked from or supplied to the storage system.

In one aspect, in order to increase security of the system and preventing that a storage container is accessed by/delivered to a user which shall not have access, the access station at the interaction area can be configured to be in a closed state or in an open state, where a storage container is available when the access station is in an open state. With this feature, the container transport assembly may be equipped with a verification system such as an RFID reader to verify that a storage container is permitted to access a given interaction area.

If the storage container is not recognized by the verification system, e.g. the RFID reader, the storage container is not allowed to enter a given drawer device at an interaction area.

The storage container may comprise a plurality of compartments wherein a user has access to at least one compartment of the storage container to be accessed.

The system may further comprise a storage control and communication system to monitor inventory, to keep track of the location of respective storage containers/bins within storage grid and/or during transport, etc. Moreover, the storage control and communication system may also comprise, or may be provided in communication with, a control system for controlling the vehicles to control the vehicles to pick the desired storage container and to deliver it at the desired location at the desired time—without colliding with other vehicles.

The invention is further defined by a method for secure storing and retrieving of storage containers linked to different users, where storage containers are transferred between the automated storage and retrieval system described above and plurality of interaction areas having access stations.

The method comprises a first step of identifying a user at an interaction area and giving access to an access station if the user is authorized.

The next step is instructing a control system of the automated storage and retrieval system to retrieve or deliver a specific storage container at the access station, where instructions are given via a user interface communicating with the control system.

The last step is transferring the specific storage container between the access station at the interaction area and the automated storage and retrieval system by means of a container transport assembly and cooperating transferring means for moving the storage container to and from the container transport assembly and the access station.

In all embodiments, both for vertical, inclined and horizontal container transport assemblies, a user orders a storage container from an unmanned storage area with an automated storage and retrieval system. When a storage container is to be transported from a storage position in a storage column in the automated storage system to a dedicated interaction area with an interface, an operation sequence may be as follows:
  ordering a specific storage container using a user operable control system (e.g. an app or a panel, or a program with list or images of contents of all available storage containers in the automated storage and retrieval system etc.),
  allocating a container handling vehicle to pick up the desired storage container from a given storage position in the automated storage and retrieval system by an overall control system,
  picking up the desired storage container by the container handling vehicle and bringing the storage container to a port area (the port area typically occupies one single cell or a storage column in the automated storage and retrieval system),
  delivering the storage container from the container handling device to the container transport assembly when the container transport assembly is ready for receiving (i.e. in case of conveyor belt, the belt is always ready for receiving, in case of fork lift, the lift is in correct position when the forks are in correct position relative the storage container) the storage container from the container handling vehicle,
  transporting the storage container to the given interaction area by the container transport assembly,
  moving (e.g. by means of an extendable and retractable element, a telescopic element, a conveyor belt arranged at the interaction area and at the container transport assembly) the storage container from the container handling assembly to the given interaction area,
  picking up the item(s) from the storage container at the access station by a user at the given interaction area,
  optionally returning the storage container to the automated storage and retrieval system, in a reversed sequence after the user has picked up the desired item(s) from the storage container.

The container handling vehicle can be a vehicle with a central cavity and cantilever construction, or a traverse travelling vehicle of a so-called 'traverse crane construction', i.e. a vehicle which is supported by a structure supported on parallel outermost end tracks, rails or beams of the storage system straddling the storage system. If using one vehicle, and the one vehicle having a cantilever construction, the vehicle may be capable of swiveling of the cantilevered lifting device to lift/lower containers into storage columns at opposite edges of the grid.

A telescopic element/device/support or an extractable and retractable element/device/support should be understood as an element that is extendable in the horizontal direction and may comprise a plurality of parts linked together which can be slid together in the retracted position and slid apart and expand the length of the element/device/support in its extracted position. However, there are many other extractable and retractable elements known to a skilled person which are within the scope of the present invention.

In the following description, numerous specific details are introduced by way of example only to provide a thorough understanding of embodiments of the claimed system and vehicle. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF THE DRAWINGS

The following drawings are appended to facilitate the understanding of the invention;

FIG. 7A is a perspective view of a container handling vehicle operating on a rail system, and a reader on the lifting frame or in the body of the container handling vehicle and a label in or on each of the storage containers;

FIG. 7B shows an example of a container handling vehicle with a central cavity or storage space, where readers are arranged on/in the sidewalls of the container handling vehicle;

FIG. 8A is a perspective view of a container handling vehicle in a gantry arrangement operating on the automated storage and retrieval system;

FIG. 8B is a side view of the traverse travelling vehicle and rail system in FIG. 8A;

FIGS. 9A and 9B show examples the traverse travelling vehicle with wheels travelling along a support structure, where the transport mechanism is above or in an upper part of the vehicle;

In the drawings, like reference numerals have been used to indicate like parts, elements or features unless otherwise explicitly stated or implicitly understood from the context.

DETAILED DESCRIPTION OF THE INVENTION

FIGS. 1 to 4 are discussed under the prior art section.

Figure 1:
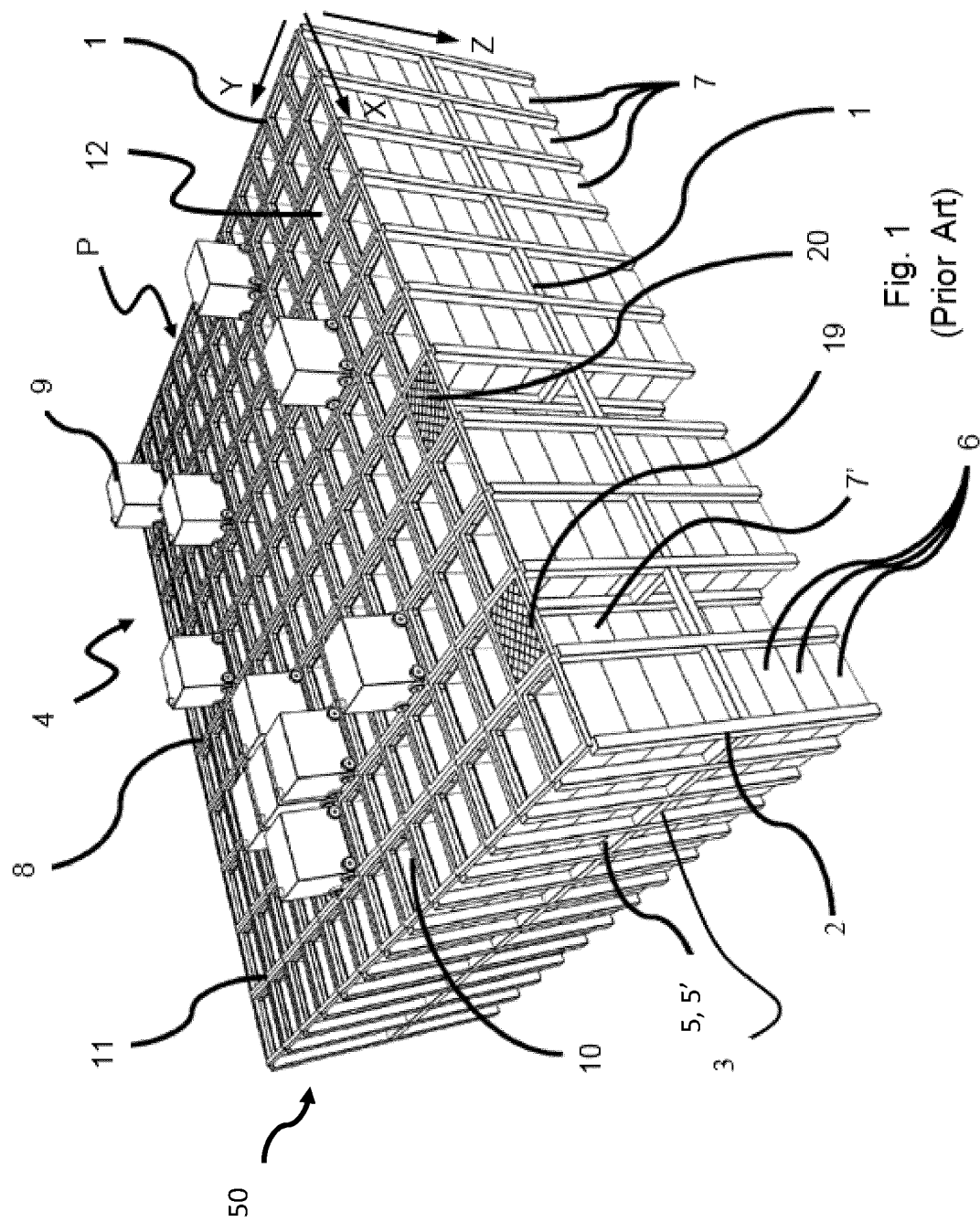
FIG. 1 is a perspective view of a grid with a rail system of a prior art automated storage and retrieval system.

FIG. 1 shows an example of a prior art grid structure 4 with a rail system 8 of an automated storage and retrieval system 50 which can be used in the disclosed invention.

Figure 2B:
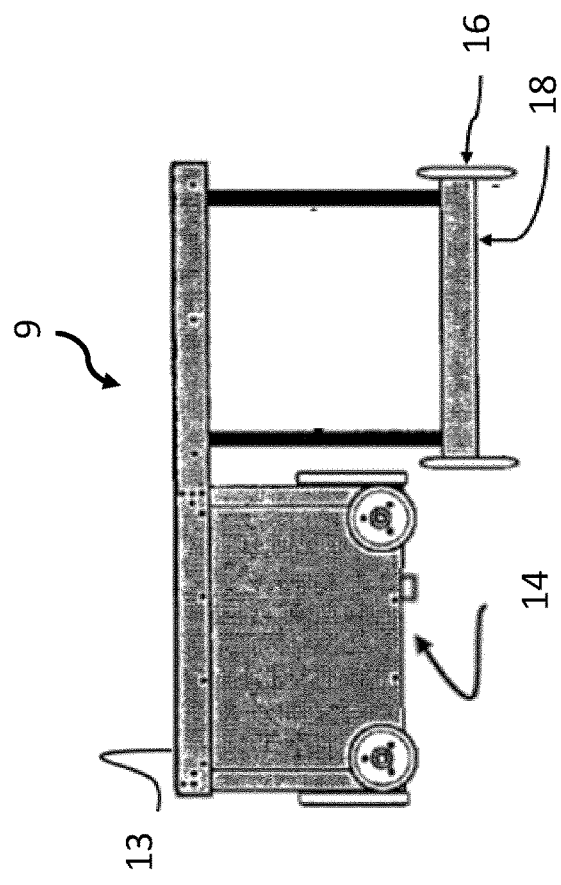
FIG. 2B is a side view of the first prior art container handling vehicle in FIG. 2B, showing a lifting device, i.e. elevator, for lifting and or lowering storage containers.
Figure 2A:
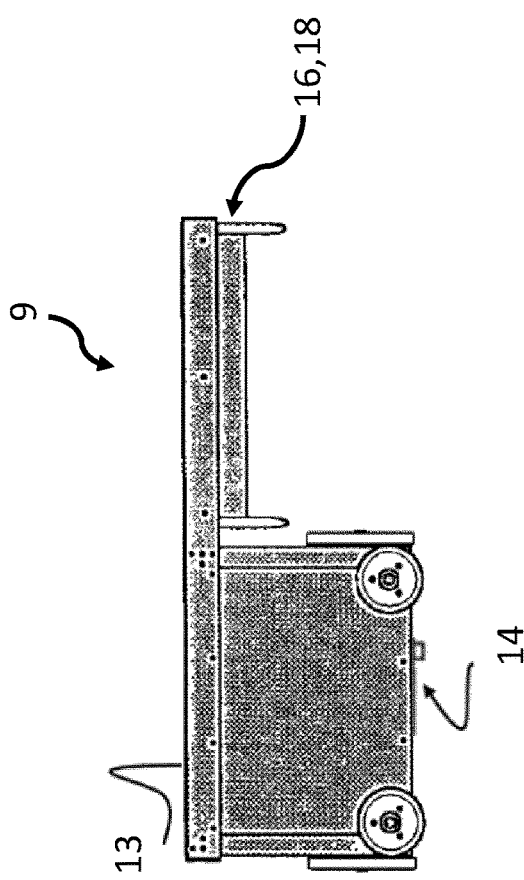
FIG. 2A is a perspective view of a first prior art container handling vehicle.
Figure 2D:
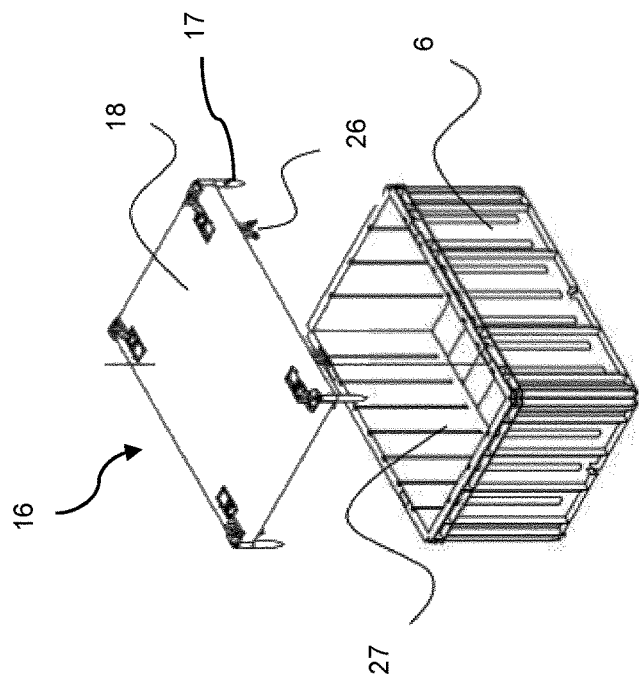
FIG. 2D is a perspective view of a prior art lifting device of container handling vehicle for lifting and or lowering storage containers.
Figure 2C:
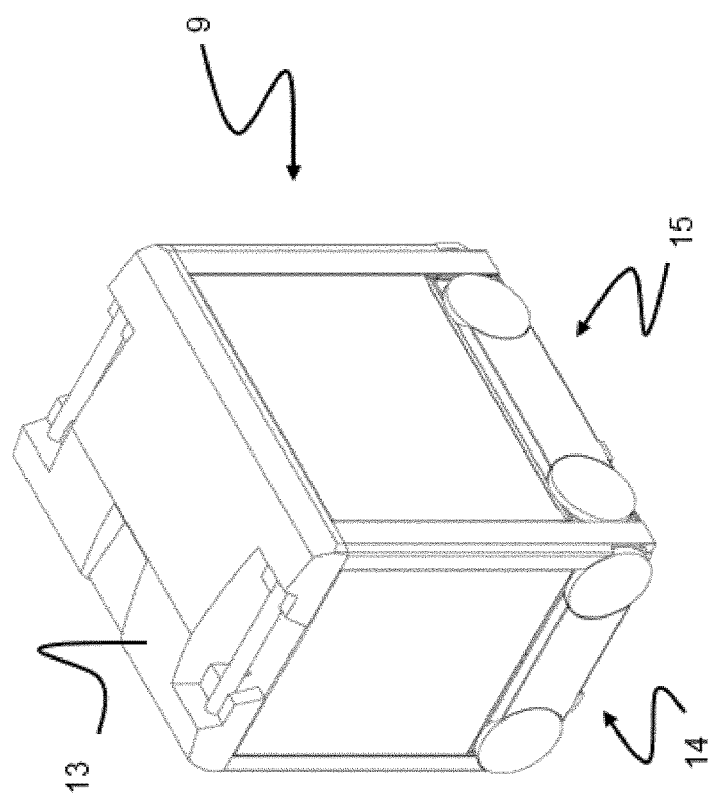
FIG. 2C is a perspective view of a second prior art container handling vehicle.

FIGS. 2A, 2B and 2C shows examples of prior art container handling vehicles 9 that can be used in the disclosed invention.

Figure 4:
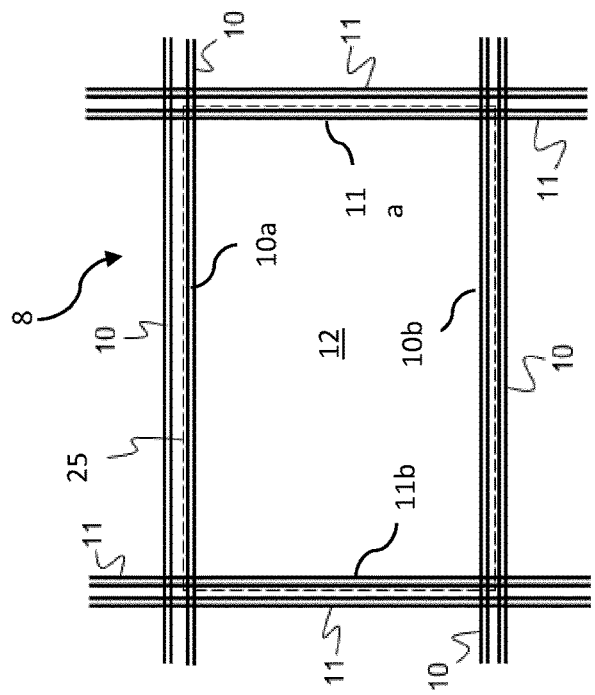
FIG. 4 is a top view of a prior art double rail grid.
Figure 3:
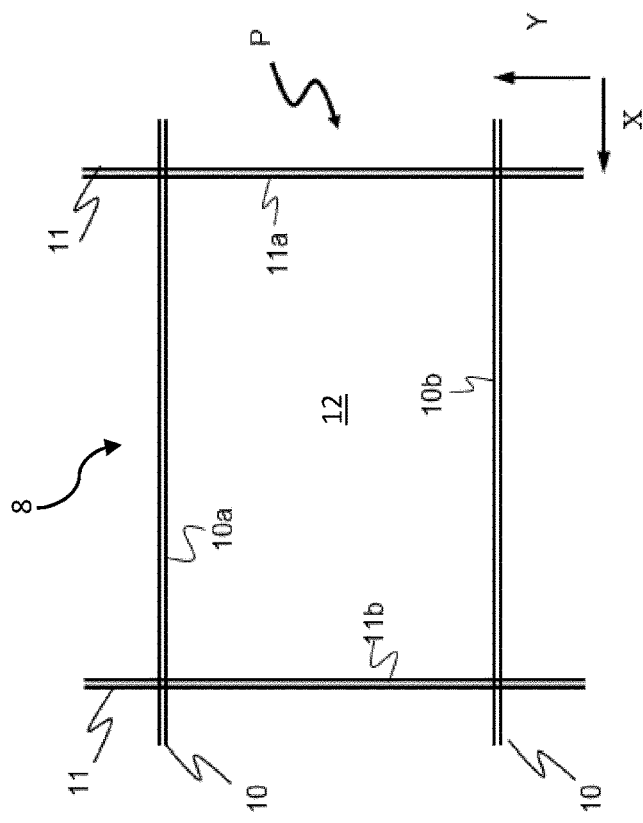
FIG. 3 is a top view of a prior art single rail grid.

FIG. 3 and FIG. 4 show examples of the top of a grid 4 with a rail system 8 of an automated storage and retrieval system which can be used in the disclosed invention. The grid 4 comprises a framework structure comprising a plurality of upright members and a plurality of horizontal members which are supported by the upright members (see FIG. 1).

The rail system 8 may also be a combination of the single track and double track rails shown in FIGS. 3 and 4. The container handling vehicles are arranged at the upper surface of the grid 4 on the rail system 8.

In the following, embodiments of the invention will be discussed in more detail with reference to FIGS. 5 to 11. It should be understood, however, that the drawings in the figures are not intended to limit the invention to the subject-matter depicted in the drawings. Furthermore, even if some of the features are described in relation to the system only, it is apparent that they are valid for the vehicle and methods as well, and vice versa, i.e. any features described in relation to the vehicle or methods only are also valid for the system.

Figure 5:
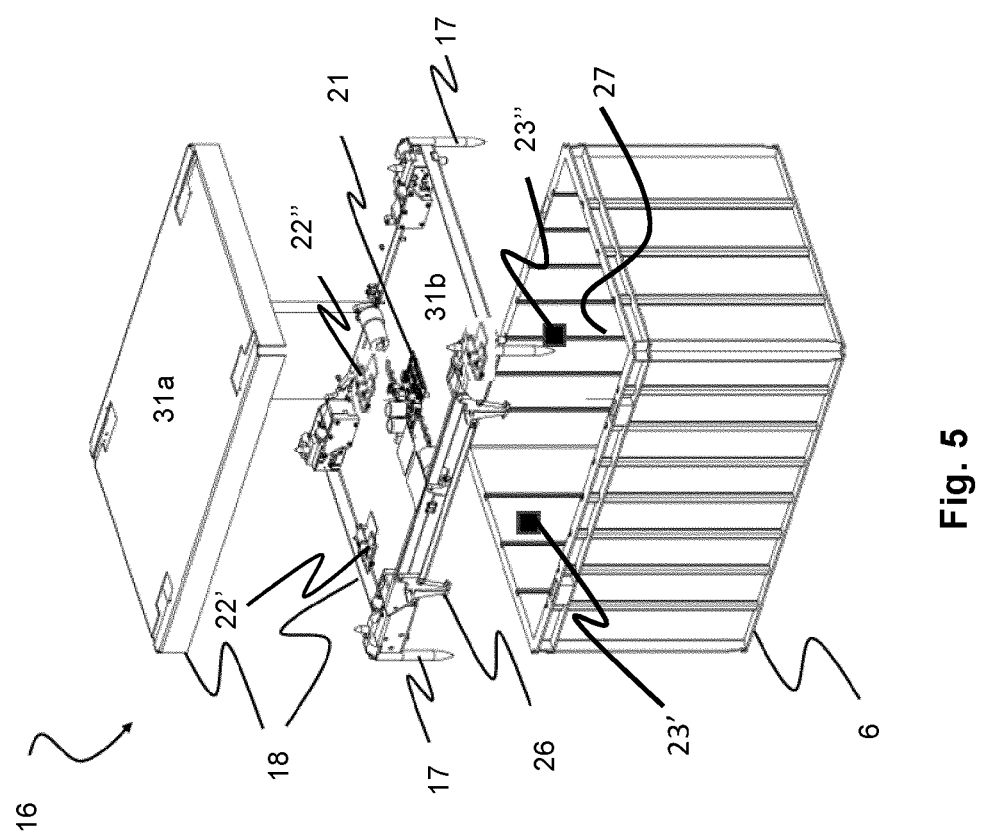
FIG. 5 shows details of a lifting frame forming part of a container handling vehicle, and a storage container, with a storage container identification system where the lifting frame comprises two readers and the storage container comprises two labels.

FIG. 5 shows an example of a lifting frame 18 of a lifting device 16 of a container handling device, which lifting frame 18 comprises a top cover 31a and a base plate 31b.

The base plate 31b comprises a plurality of gripping devices 26 for gripping/engaging with a storage container 6 and a plurality of guiding pins 17 for aligning the lifting frame 18 with the storage container 6. The gripping devices 26 of the lifting frame 18 are configured to grip and release a storage container 6 therefrom and can be wirelessly operated by a control unit.

The lifting plate 31 further comprises one or more cameras 21 installed on the lifting plate 31, preferably within the base cover 31b. The one or more cameras 21 are configured to record and register images of products arranged below the lifting frame 18, i.e. into the framework structure 1 and underlying storage containers 6. The one or more cameras 21 can be electronically connected, either wirelessly or by wire, to a control system (not shown) such that an operator may have real-time visual view of the grid and or content of one or more of the storage containers 6.

FIG. 5 further discloses a storage container identification system comprising two readers 22', 22" installed on the lifting plate 31 of the lifting frame 18 and two labels 23', 23" positioned inside the storage container 6. The labels 23' 23" comprise information of the storage container 6. The readers 22', 22" are configured to read the labels 23', 23" for identifying the storage container 6. There may also be only one reader on each lifting plate 31. Preferably, the readers 22', 22" and the labels 23', 23" are located relatively proximate each other, e.g. in positions close to each other as indicated by the reader denoted 22' and label denoted 23' as well as the reader denoted 22" and label denoted 23", respectively. This may be advantageous to avoid interference from neighboring storage container(s) 6 with the result that a label in a neighboring storage container 6 is read instead of the label of the correct storage container 6.

Metallic plates or other means to shield interfering electromagnetic waves from neighbouring storage container may also be arranged around the labels 23', 23". In FIG. 5 the storage container 6 comprises a single compartment 27, however storage containers comprising multiple compartments are also known and may also be used in the present invention.

For monitoring and controlling the automated storage and retrieval system so that a desired storage container 6 can be delivered to the desired interaction area at a desired time without the container handling vehicles colliding with each other, the automated storage and retrieval system comprises a control system (shown in FIG. 12 described below).

Figure 6C:
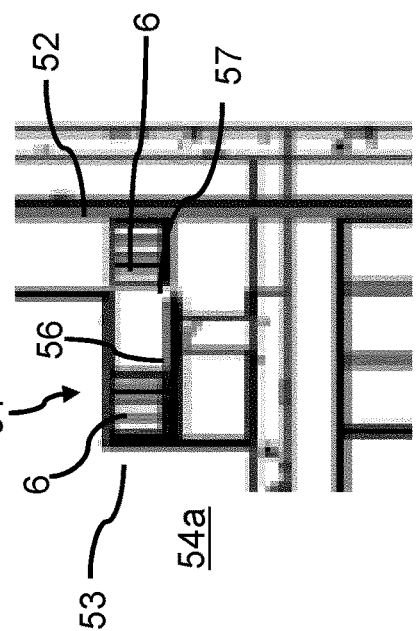
FIG. 6C is a detailed view of section B in FIG. 6A, showing the extendable and retractable element in FIG. 6B in a retracted position, and one storage container in the container handling assembly and one storage container in the interaction area.
Figure 6B:
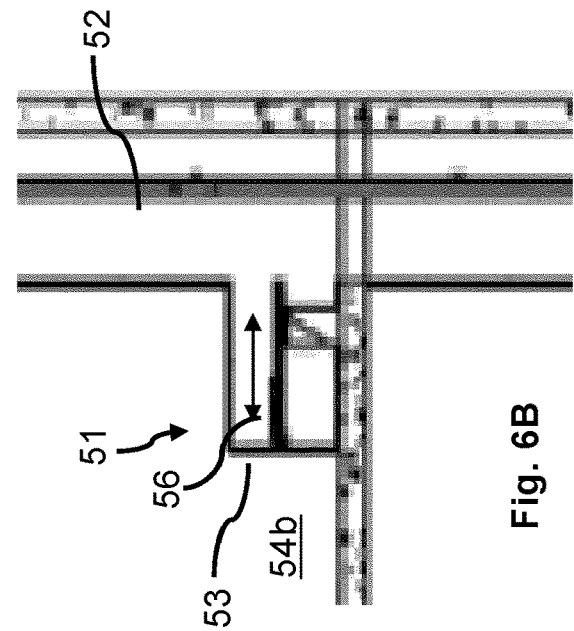
FIG. 6B is detailed view of section A in FIG. 6A, showing a first possible cooperation between the container transport assembly and the interaction areas in FIG. 6A, using an extendable and retractable element mounted at each interaction area for moving of storage containers between the container transport assembly and the interaction area, and vice versa.
Figure 6A:
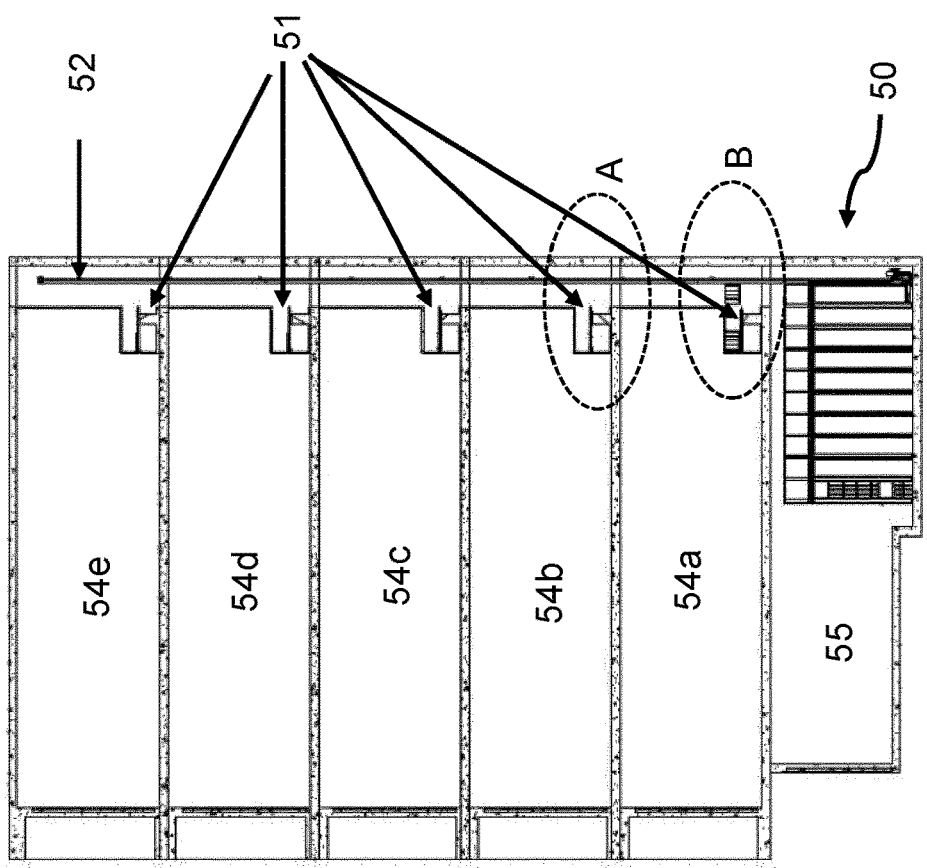
FIG. 6A is a side view of a five storey apartment building with an automated storage and retrieval system in the basement of the building, and with a vertical container transport assembly connecting the automated storage and retrieval system with the interaction areas at each floor (ground floor, 1st floor, 2nd floor, 3rd floor, 4th floor)

FIG. 6A is a side view of a five storey apartment building comprising a basement 55 wherein the automated storage and retrieval system is arranged, and five apartments 54a-e are arranged above the basement 55. A vertical container transport assembly 52 connects the automated storage and retrieval system with the interaction areas at each floor (ground floor 54a, 1$^{st}$ floor 54b, 2$^{nd}$ floor 54c, 3$^{rd}$ floor 54d, 4$^{th}$ floor 54e) for transferring storage container 6 from the automated storage and retrieval system to the interaction area(s) and vice versa.

The vertical container transport assembly 52 is in this exemplary embodiment a lift comprising a storage container support 57 (ref. FIG. 6C) wherein the storage container 6 is placed on it allowing the storage container 6 to be transported in the vertical direction from the automated storage and retrieval system 50 to the interaction area(s) 51 and vice versa.

The storage container support 57 may be of any shape allowing the storage container to be arranged thereon without falling off during transportation.

The container support assembly 52 for transferring storage containers 6 between an automatic storage and retrieval system and interaction areas 51 will be adapted to suit the floor plan of a house where the system is installed. Different embodiments of the container support assembly 52 are feasible. It may be installed as a vertical lift, a paternoster elevator or with a part for lifting the storage container 6 in a horizontal direction for transferring storage containers to different interaction areas located at same floor.

The container transport assembly 52 can be similar to a storage container/bin lift as disclosed in WO2014/075937 which is incorporated herein by reference. This publication describes an automated storage and retrieval system with a storage container lift device arranged to convey a storage container in a vertical direction between a top level of a grid structure and a delivery station. The lift device includes a movable support for a storage container, the movable support being arranged to slide in a vertical frame which includes at least two, possibly four, vertical columns, which are arranged at corresponding corners of the storage container when positioned to be supported by the movable support. The storage container lift device is further arranged to be elevated or lowered by appropriate lifting means.

The container transport assembly 52 in this exemplary embodiment receives the storage container 6 from the container handling vehicle 9 at the top level of the storage grid 4 and conveys the storage container 6 to the level of a designated interaction area 51.

FIG. 6B is a detailed view of section A in FIG. 6A, showing an exemplary embodiment of the cooperation between the container transport assembly 52 and the interaction area 51 in the 1$^{st}$ floor 54b of the apartment building, shown in FIG. 6A, using a transfer element 56 for transferring a storage container 6 between the container transport assembly 52 and the interaction area 51, and vice versa.

The transfer element 56 may for example be a grabber or an unloader, for example, comprising a pivotable, translating or extendable and retractable telescopic arm or frame for moving the storage container 6 horizontally, or it may comprise a conveyor belt mounted at each interaction area 51 with a deflector of some form to move the storage container 6 off and onto a lifting shuttle of the storage container lift. The arrow in FIG. 6B is indicating the horizontal direction of movement of the transfer element 56.

FIG. 6C is a detailed view the exemplary embodiment of the cooperation between the container transport assembly 52 and the interaction area 51 on the ground floor 54a of the apartment building shown in FIG. 6A. FIG. 6C shows the transfer of one single storage container 6 from the storage container support 57 of container transport assembly 52 to the interaction area 51 of the ground floor apartment 54a or vice versa. The transfer element 56 shown is an extendable and retractable element/telescopic element arranged at the base of the interaction area 51 and is in its extended position when receiving the storage container 6 from the container transport assembly 52. After receiving the storage container 6, the transfer element 56 retracts to its retracted position which will be adjacent to the access station 53. Thus, the user will be able to access the container 6 via the access station 53 when the transport assembly 56 is at its retracted position and the storage container 6 is placed thereon. The transfer element 56 may also be moveable in the horizontal direction indicated by arrows in FIG. 6B.

The transfer elements 56 in FIGS. 6A-6C may in another exemplary embodiment be a fork-shaped transfer element 56 wherein the fork-shaped transfer element engages with the storage container 6 at the base of the storage container 6. When for example moving the storage container 6 from the storage container support 57 of the container transport assembly 52 to the interaction area 51, the transfer element 56 will be extracted until it can receive or lift the storage container 6 from below. The storage container 6 may comprise a recess underneath or at the outer surface of its base allowing the fork-shaped transfer element 56 to slide underneath the storage container 6, or the storage container support 57 may comprise a recess allowing the fork to slide between the base of the storage container 6 and the upper surface of the storage container support. Further, the transfer element 56 may be able to be raised and lowered in the vertical direction. Thus, when the transfer element 56 is arranged underneath the storage container 6, meaning between the base of the storage container 6 and the upper surface of the storage container support 57, the transfer element 56 will be raised to slightly lift and subsequently remove the storage container 6 from the container transport assembly 52. By retracting the transfer element 56, the storage container 6 will be transferred/moved from the container transport assembly 52 into the interaction area 51 until the container 6 reaches the access station 53 where it can be accessed by the user. Then, when returning the storage container 6 back to the container transport assembly 52 from the interaction area 51, the transfer element 56 will extend until it reaches the transport assembly 52 and the transfer element 56 will be slightly lowered to place the storage container 6 on the storage container support 57 before the transfer element 56 is retracted away from the container transport assembly 52.

One exemplary embodiment of the cooperation between the container transport assembly 52 and interaction areas 51 is an embodiment where each interaction area is passive, i.e. it does not need to have active mechanical and controlled cooperating means. In this embodiment, only the storage container support 57 is extendable and retractable for moving storage containers 6 between the container transport assembly 52 and the interaction area 51, and vice versa.

In this exemplary embodiment the extendable and retractable storage container support 57 is for instance a fork-shaped support wherein the fork-shaped support can slide underneath the storage container 6 when the storage container 6 is arranged at the base supporting the storage container 6 in the interaction area 51. In one embodiment, this is enabled if the base of the storage container 6 is provided with slots allowing the fork-shaped support to slide its prolongs into.

In another embodiment, the upper surface of the base supporting a storage container in the interaction area 51 may comprise recesses allowing the fork shaped support to slide its prolongs into such that it is placed between the base of the storage container 6 and the upper surface of the base supporting a storage container 6 in the interaction area 51.

Another feasible option for transferring a storage container 6 between an interaction area 51 and a container support assembly 52 is a lifting frame, like that described above, connected to a set extendable rails running between the interaction area 51 and the container transport assembly 52.

The storage container 6 can be transferred from the container support 57 of the container transport assembly 52 e.g. extending the container support 57 into the interaction area and thereafter lower the container support 57 by moving the container transport assembly downwards such that the storage container is removed from the container support onto the upper surface of the base of the interaction area 51. The container support can the retract without the container 6, for such that the container transport assembly can work picking up other storage container within the system. When the container support 57 of the container transport assembly 52 is picking up the storage container 6 from the interaction area 51, the container storage support 57 will extend horizontally into the interaction area 51 to a position between the base of the storage container 6 and the upper surface of the base of the interaction area 51. The support structure 57 may then be lifted in the vertical direction by the container transport assembly 52 thereby lifting the storage container 6 from the base of the interaction area 51 onto the container transport assembly 52, and the container support structure 57 will then retract and the container transport assembly 52 will deliver the storage container 6 to the automated storage and retrieval system.

The container support structure 57 may also be moving slightly downwards during the transfer of the container from the container support structure 57 to the transfer element 56 or upwards when transferring the container 6 vice versa, thereby enabling a tranquil and smooth transfer of the storage container 6.

The transfer element 56 in FIGS. 6A-6C may in yet another exemplary embodiment be a telescopic element extending in the horizontal plane as illustrated by arrows in FIG. 6B and configured to transfer a storage container 6 from the container transport assembly 52 to the interaction area 51 and vice versa. Further, the storage container support 57 of the container transport assembly 52 may also be a telescopic element which is pushed into an extended position by the transfer element 56 when the transfer element 56 is extracted towards its fully extended position. When a storage container 6 has been transferred from the container transport assembly 52 to the interaction area 51, the container support structure 57 is pushed away and removed from underneath the storage container 6, and the storage container 6 is further transferred into the interaction area 51 by the transfer element 56 which will retract thereby bringing the storage container 6 fully into the interaction area 51 in a position adjacent to the access station enabling a user to access the container.

When transferring the storage container 6 to the container transport assembly 52 from the interaction area 51, the container storage support 57 will extend thereby pushing the transfer element 56 into a retracted position allowing the storage container to be removed therefrom and onto the container storage support 57 being in its extended position. The container support structure 57 will then retract to a retracted position allowing the storage container 6 to be moved by the container transport element 52 and transported to the automated storage and retrieval system 50.

In another exemplary embodiment enabling cooperation between the container transport assembly 52 and the interaction areas 51 in FIG. 6A, the transfer element 56 and container support structure 57 each has a conveyor belt mounted thereto. For easy transfer of a storage container 6 arranged on the container support structure 57 to the transfer element 56 arranged within the interaction area 51, the container support structure 57 can be arranged at a slightly higher level than the transfer element 56 receiving the storage container 6. When transferring the storage container, the other way from the transfer element 56 to the container support structure 57, the container support structure 57 can be arranged at a slightly lower level than the transfer element 56 transferring the storage container 6 therefrom. Further, the container support structure 57 and the transfer element 56 should be at a distance allowing the container 6 to be easily transferred.

The container support structure 57 may also be move slightly downwards during the transfer of the container from the container support structure 57 to the transfer element 56 or upwards when transferring the container 6 in the other direction, thereby enabling a tranquil and smooth transfer of the storage container 6.

The terms "slightly higher or lower" or "slightly vertically" used herein should be understood as being so high or low, or moving a vertical distance enabling an easy and smooth transfer of the storage container from one element/structure/support to another without the container rotating or getting stuck between the elements/structures/supports.

In addition to arranging the automated storage and retrieval system in a basement as shown in FIG. 6A, it may be arranged in an attic or loft of a building, with a container transport assembly 52 connecting the automated storage and retrieval system 50 with an interaction area 51 at each floor 54a-54d. The automated storage and retrieval system may further be arranged in a specific floor in a building having multiple floors, e.g. it is arranged in $3^{rd}$ floor in a building having 6 floors. The transfer of the storage container 6 from container transport assembly 52 into the interaction area 51 and vice versa can be similar as described above e.g. as illustrated in FIG. 6C.

If for instance the container transport assembly 52 is arranged in the center of a building where two apartments are arranged in each floor and where an automated storage and retrieval system 50 is arranged in the attic or loft of the building between the apartments on each floor, for example in a fallway/shaft it may comprise a twin bin lift similar to the one disclosed in WO 2014/075937 A1. The container transport assembly may transport two storage containers at the same time from the automated storage and retrieval system to two different designated interaction areas and vice versa.

Another example is a building with several apartments arranged on the same level and with a common automated storage and retrieval system arranged at one end of the building and at the same level as the apartments, and where a horizontal container transport assembly connects the automated storage and retrieval system with interaction areas in each private section of the row house.

A person skilled in the art will understand that there are multiple automated solutions regarding the transfer of a storage container from the automated storage and retrieval system to the container transport assembly and vice versa; and likewise, there are a multiple of automated solutions regarding the transfer of a storage container from the container transport assembly to the interaction area(s) and vice versa. The present invention is therefore not limited to the examples showing such transfer above.

FIG. 7A shows an example of a container handling vehicle 9 with a cantilever construction operating on a guiding assembly comprising a first guiding system in the form of tracks 10 arranged in a first horizontal plane (P1, P2) and extending in a first direction X, and a second guiding system in the form of tracks 11 arranged in a second horizontal plane (P1, P2) which is in the same horizontal plane as the first guiding system, and extending in a second direction Y. The second direction Y is orthogonal to the first direction X. The first and second set of tracks form a rail system 8. The figure further shows a reader 22', 22" installed on the lifting plate 31 of the container handling vehicle 9. Alternatively, also disclosed in FIG. 7A, in addition to or as a replacement of the reader 22', 22" on the lifting plate 31, the reader 22', 22" can be arranged in a storage space, e.g. in a cavity or in the body 13 of the container handling vehicle 9. Labels 23', 23" are disclosed in each of the storage containers 6 in the front row of the figure. It is however clear that the remaining storage containers 6 in the system are also provided with at least one label. To make sure that the reader(s) 22', 22" can read the label 23', 23" in all of the storage containers 6, the labels 23' are preferably arranged at the same position(s) in each container 6. The labels 23', 23" may also be arranged on the outside of the container(s) 6 such that a reader 22', 22" arranged in/on a sidewall facing the storage space of the vehicle 9 can easily identify the storage container 6.

The first and second horizontal planes P1, P2 are at the same elevation or level in the embodiment of FIG. 7A, i.e. at an elevation equal to an upper surface of the rail system 8.

FIG. 7B shows an example of a container handling vehicle 9 with a central cavity construction, where readers 22', 22" are arranged on/in the sidewalls of the container handling vehicle 9. While two readers 22', 22" are disclosed in the sidewalls, fewer or more readers may be provided in one or all sidewalls of the vehicle 9, possibly in addition to or in place of one or more readers provided in the top cover of the vehicle 9.

FIG. 8A is a perspective view of a traverse travelling vehicle 9' operating on a rail system 8, whereas FIG. 8B is a side view of the traverse travelling vehicle 9' and rail system 8 in FIG. 8A. Similar to the embodiment of FIG. 5, although not shown in FIGS. 8A and 8B, the traverse travelling vehicle 9' comprises at least one reader 22', 22" arranged on the lifting frame 18 and/or in a storage space inside a cavity or in the vehicle body 13, which at least one reader 22', 22" is adapted to read a label 23', 23" on the storage container 6. The labels 23', 23" may be inside of, or outside of, the storage containers 6. As is clear from FIG. 8A, a label 23' is arranged inside of or on an outer surface of each storage container 6, preferably at the same location such that the reader 22', 22" can easily identify the label 23', 23" and thus the storage container 6. A plurality of stacks of storage containers 6 are arranged in storage columns below the rail system 8.

According to the embodiment in FIGS. 8A and 8B, the traverse travelling vehicle 9' typically travels on a rail system 8 comprising a first set of parallel tracks 10 arranged in a first horizontal plane P1 and extending in a first direction X, and a second set of parallel tracks 11 arranged in a second horizontal plane P2 and extending in a second direction Y which is orthogonal to the first direction X. The second horizontal plane P2 is, in the embodiments of FIGS. 8A and 8B, arranged at a higher elevation or level than the first horizontal plane P1. The second set of parallel tracks 11 is disclosed as two parallel beams extending over the full length of the rail system in the Y direction. Alternatively, the two parallel beams may be replaced by a single beam. The vehicle 9', with lifting device 16 and lifting frame 18 is supported from the second set of parallel tracks 11 and operates at a horizontal level above the first set of parallel tracks 10. A first end portion of the beams is supported by a first support structure 24' connected to a set of wheels 14, 15, and the second end portion of the beams is supported by a second support structure 24" connected to another set of wheels 14, 15, for movement of the vehicle 9' in the X direction of the rail system 8. Alternatively, as seen in FIG. 9B, the set of wheels 14, 15, i.e. the transport mechanism, can be in the second horizontal plane P2.

FIG. 9A shows an example of first and second guiding systems and transport mechanism in the form of a cable or belt configuration. The first and second guiding systems and transport mechanism can be cables and belts, where a cable or belt 43, 44 is used in pulling the vehicle in the X and Y directions, either automatically or manually, e.g. by pulling by hand or using one or more winches 45 controlled with for instance servo motors. In the latter aspect, preferably at least one set of cables or belts 43, 44 extends in the X direction while at least one other set of cables or belts 43, 44 extends in the Y direction.

FIG. 9B shows an example of first and second guiding systems and transport mechanism 14, 15 travelling on a support structure 41 in the form of a beam arrangement. As seen in FIG. 9B, the set of wheels 14, 15, i.e. the transport mechanism, can be in the second horizontal plane P2. In this latter aspect, both the transport mechanism moving the vehicle 9' in the X direction and the Y direction are arranged in the same horizontal plane (i.e. the second horizontal plane P2). In this aspect, there may be a support structure 41 extending along an outer periphery in the X and Y directions covering all of storage columns 5, and the vehicle 9' can be suspended from one or more beams 42. The transport mechanism 14, 15 moving the vehicle in the Y direction can be arranged above or in an upper part of the vehicle 9' and can be wheels or sheaves etc (as exemplified in FIG. 9B) travelling on or, being supported by, the one or more beams 42. Similarly, the transport mechanism 14 moving the vehicle 9' in the X direction may comprise wheels or sheaves travelling on the support structure.

The vehicle(s) 9, 9' typically communicate with the control system from a control panel, typically arranged on top of the vehicle 9, via wireless communication means, e.g. via a WLAN operating under an IEEE 802.11 (WiFi) standard and/or utilizing a mobile telecommunication technology such as 4G or higher.

Each vehicle 9, 9' comprises a battery which provides power to onboard equipment, including the lifting motor, the drive system for the first and second wheel arrangements 14, 15 and onboard control and communications systems.

Figure 10:
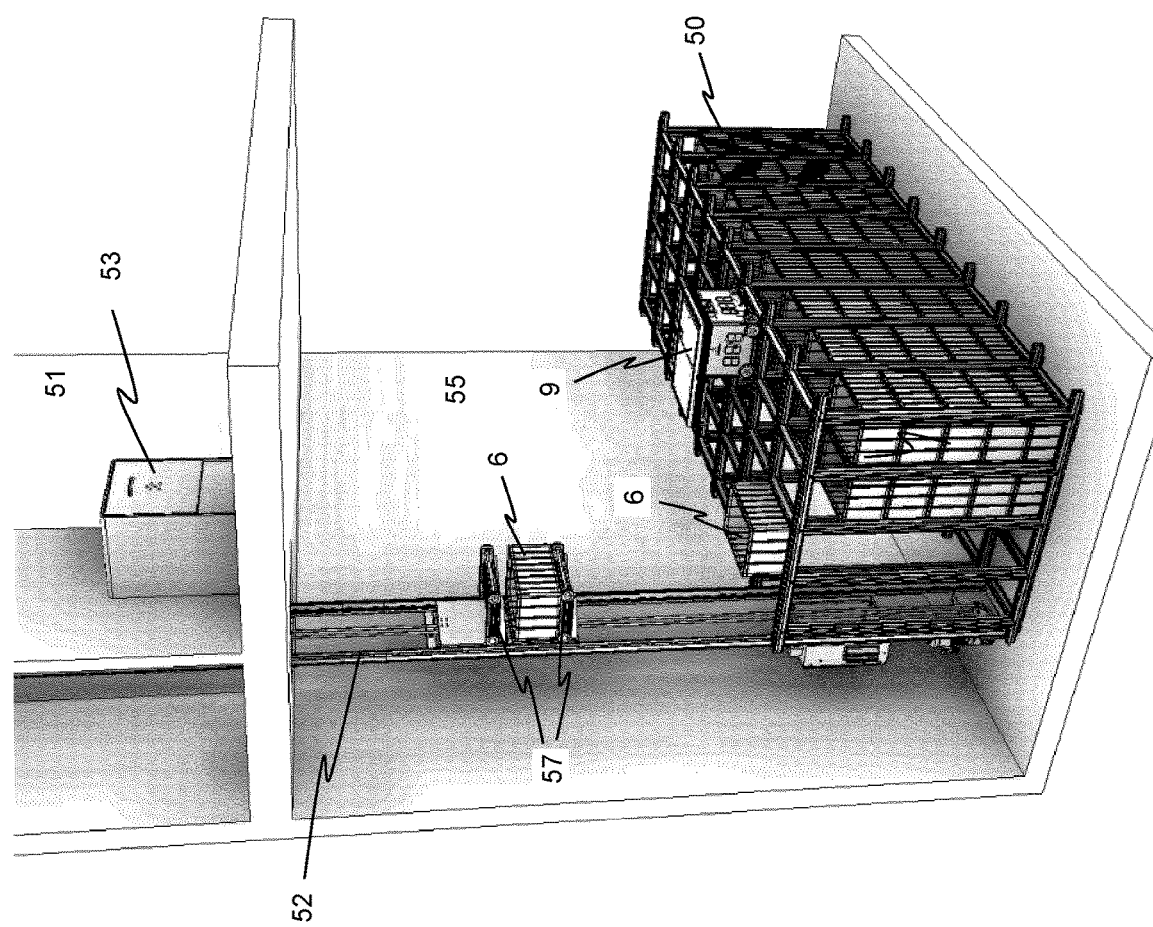
FIG. 10 shows an example of an automated storage and retrieval system located in a basement and with an interaction area on a floor above.

FIG. 10 shows an example of an automated storage and retrieval system 50 located in a basement 55 of a house and where an interaction area 51 is installed in an apartment above the basement 55. A container handling vehicle 9 operating the automated storage and retrieval system 50 is delivering and picking up storage containers 6 to and from a storage container support 57. A container transport assembly 52 is transferring storage container supports 57 between the automated storage and retrieval system 50 and the interaction area 51. A user operates the automated storage and retrieval system 50 from an interaction area 51 via an access station 53 which in this example is a drawer. The drawer is accessible for a user upon successful identification. The identification means may be implemented in a mobile device such as a tablet or mobile phone signal connected to the control system of the automated storage and retrieval system 50. It may also be implemented in a fixed installation provided with a user operable interface for accessing the system.

Figure 11:
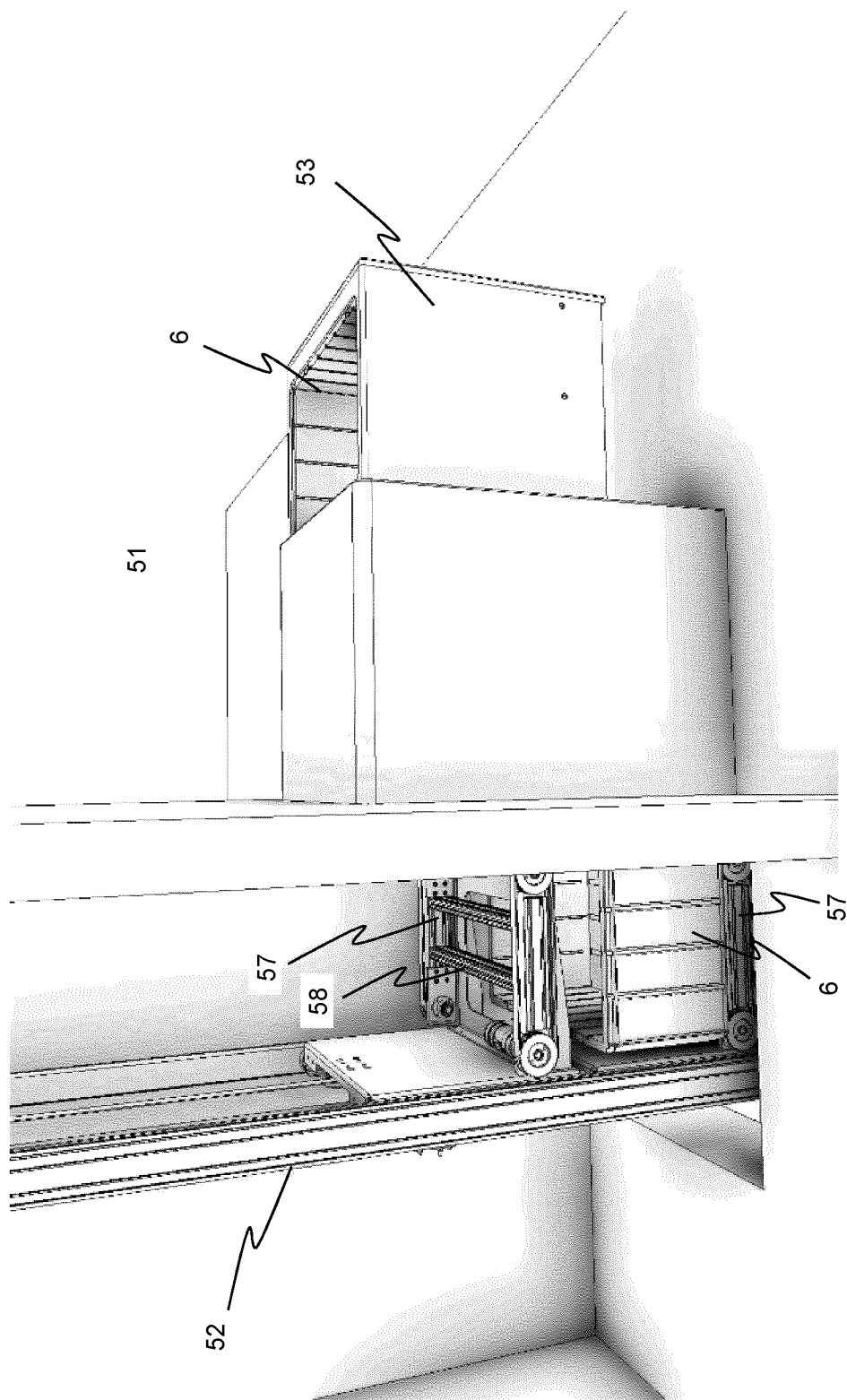
FIG. 11 shows an example of details of a container transport assembly and an interaction area.

FIG. 11 shows an example of details of a container transport assembly 52 and an interaction area 51. As described above, the container transport assembly 52 and the interaction area 51 comprise cooperating transferring means for moving a storage container 6 to and from the container transport assembly 52 and the interaction area 51. In the example shown in FIG. 11, a storage container supports 57 are connected to and driven by the container transport assembly 52. Each storage container support 57 may comprise a conveyor belt, driven rollers, or other devices for transferring a storage container 6 to and from the interaction area 51.

FIGS. 10 and 11 show an installation comprising two storage container supports 57. This set-up enables retrieving or storing of two storage containers 6. These may for be access via different interaction areas 51.

Figure 12:
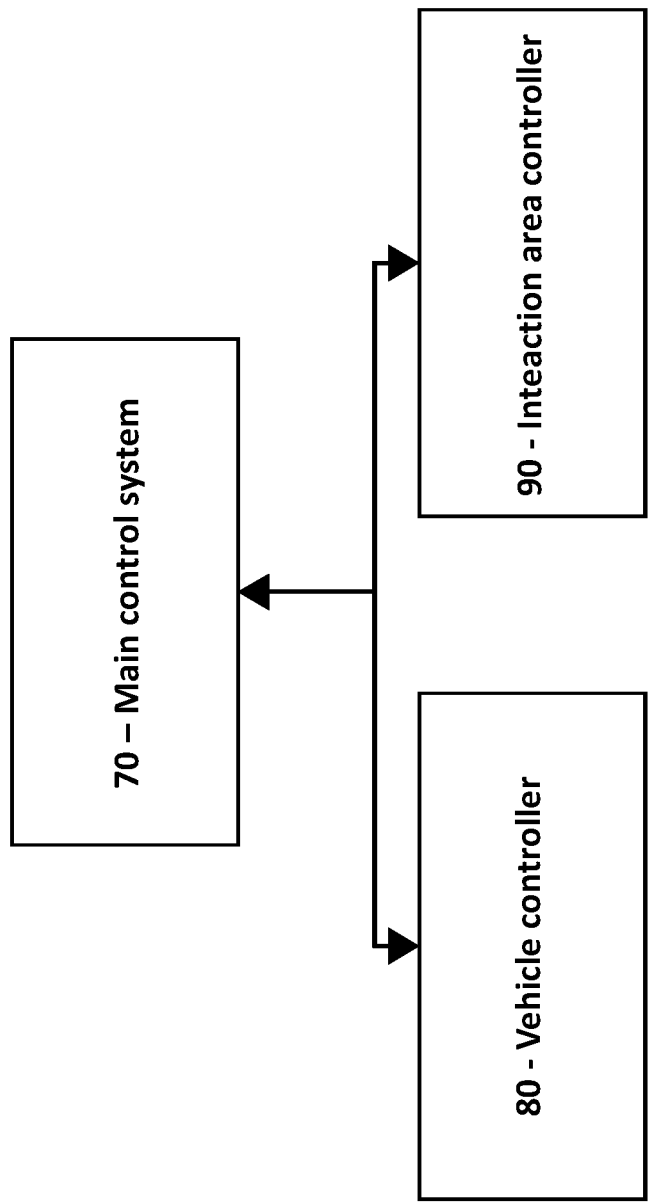
FIG. 12 illustrates communication paths between a main control system, a vehicle controller and an interaction area controller.

FIG. 12 illustrates communication paths between a main control system 70, a vehicle controller 80 and an interaction area controller 90 for monitoring and controlling the automated storage and retrieval system so that a desired storage container 6 is delivered to a specific interaction area 51. The main control system 70 is computerized and comprises a database for monitoring and controlling e.g. the location of the respective storage containers 6 within the storage grid 4, the content of each storage container 6 and the movement of the container handling vehicles 9.

In the preceding description, various aspects of an automated storage and retrieval system, vehicle and methods according to the invention have been described with reference to the illustrative embodiment. However, this description is not intended to be construed in a limiting sense. Various modifications and variations of the illustrative embodiments, as well as other embodiments of the system, which are apparent to persons skilled in the art, are deemed to lie within the scope of the present invention as defined by the following claims.

LIST OF REFERENCES

| | |
|---|---|
| P1 | First horizontal plane |
| P2 | Second horizontal plane |
| 1 | Framework structure |
| 2 | Upright member |
| 3 | Horizontal member |
| 4 | Storage grid |
| 5 | Storage column |
| 5' | Grid column |
| 6 | Storage container |
| 7 | Stack |
| 8 | Rail system |
| 9 | Container handling vehicle |
| 9' | Traverse travelling vehicle |
| 10 | First set of rails |
| 11 | Second set of rails |
| 12 | Grid opening |
| 13 | Container handling vehicle body |
| 14 | First set of wheels (transport mechanism) |
| 15 | Second set of wheels (transport mechanism) |
| 16 | Lifting device |
| 17 | Guiding pin |
| 18 | Lifting frame |
| 19 | First port column |
| 20 | Second port column |
| 21 | Camera |
| 23', 23" | Reader |
| 23', 23" | Label |
| 24' | First support structure |
| 24" | Second support structure |
| 25 | Footprint |
| 26 | Gripping device |
| 27 | Single compartment |
| 31 | Lifting plate |
| 31a | Top cover |
| 31b | Base cover |
| 41 | Support structure |
| 42 | Beam |
| 43 | Rope chain X direction |
| 44 | Rope, chain Y direction |
| 45 | Winch |
| 50 | Automated storage and retrieval system |
| 51 | Interaction area |
| 52 | Container transport assembly |
| 53 | Access station |
| 54a-e, 54a-d' | Apartments/Floors |
| 55 | Basement |
| 56 | Transfer element |
| 57 | Storage container support |
| 58 | Support transfer element |
| 70 | Main control system |
| 80 | Vehicle control system |
| 90 | Interaction area control |

The invention claimed is:

1. A system for providing secure storage and retrieval of storage containers linked to different users, comprising:
an automated storage and retrieval system, having a framework structure defining a storage grid for storing storage containers arranged in stacks in storage columns and at least one container handling vehicle configured to raise storage containers from and lower storage containers into the storage columns and to transport storage containers to a container transport assembly connecting the automated storage and retrieval system to a plurality of interaction areas for accessing and transferring storage containers to and from the automated storage and retrieval system, a main control system connected to an interaction area controller for keeping track of storage containers and their location in the automated storage and retrieval system and for controlling transfer of storage containers between the automated storage and retrieval system and the plurality of interaction areas, where the container transport assembly and the plurality of interaction areas both comprise a storage container support configured to move a storage container to and from the container transport assembly and the plurality of interaction areas, wherein
the plurality of interaction areas are installed in different apartments in a building, the container transport assembly extending between the storage grid and the plurality of interaction areas comprises a vertical or inclined storage container lift or a horizontal conveyor, and where each interaction area comprises at least one access station for giving access to and enabling transferring of the storage containers or items to and from the interaction area, and a device comprising a user interface, the device configured to identify a user, control user access to the at least one access station, and interact with the automated storage and retrieval system, the device further configured to register, in an inventory database, one or more items of the items to be stored in the storage containers based on image data associated with the one or more items, wherein the device located at a first interaction area of the plurality of interaction areas is configured to (1) verify user access to the first interaction area and (2) verify user access to one or more storage containers at the first interaction area, and wherein only the one or more storage containers that are registered in the automated storage and retrieval system by a user and at the first interaction area will be available to the user at the first interaction area after the verification of the user's access to the first interaction area and the verification of the user's access to the one or more storage containers at the first interaction area.

2. The system according to claim 1, wherein the interaction area comprises a transfer element for moving a storage container to and from the at least one access station and the container transport assembly.

3. The system according to claim 1, wherein the plurality of interaction areas are arranged at different vertical floors in the building.

4. The system according to claim 1, wherein the plurality of interaction areas are arranged at different vertical floors than a floor where the storage grid is installed.

5. The system according to claim 1, wherein the plurality of interaction areas are arranged on same floor in the building.

6. The system according to claim 1, wherein the storage grid is installed in a basement, an attic, or in between the plurality of interaction areas in the building.

7. The system according to claim 1, wherein the device is a smart phone or tablet connected to and communicating with the main control system.

8. A building comprising a system according to claim 1 for providing secure storing and retrieving of storage containers linked to different users.

9. A method for secure storing and retrieving of storage containers linked to different users, where storage containers are transferred between an automated storage and retrieval system, according to claim 1, and a plurality of interaction areas having access stations, the method comprising:
  identifying a user at an interaction area and giving access to an access station if the user is authorised;
  instructing a main control system of the automated storage and retrieval system to retrieve or store a specific storage container at the access station, where instructions are given via a user interface communicating with the main control system; and
  transferring the specific storage container between the access station at the interaction area and the automated storage and retrieval system by a container transport assembly and a support for moving the specific storage container to and from the container transport assembly and the access station, where the container transport assembly is extending between a storage grid and the plurality of interaction areas and comprises a vertical or inclined storage container lift or a horizontal conveyor.

10. The method of claim 9, wherein the method is for storing and retrieving storage containers that are linked to users who are residents of a building comprising a plurality of apartments, the plurality of apartments providing an accommodation for the users, and wherein the storage containers are stored in and retrieved from the storage grid of the automated storage and retrieval system that is housed in a portion of the building which is separated from the accommodation by at least the access stations of the plurality of interaction areas.

\* \* \* \* \*